United States Patent
Goodfellow (10) Patent No.: US 6,697,885 B1
(45) Date of Patent: Feb. 24, 2004

(54) AUTOMATED DMA ENGINE FOR ATA CONTROL

(76) Inventor: Anthony E. B. Goodfellow, 2052 Alton Pkwy., Irvine, CA (US) 92606

( * ) Notice: Subject to any disclaimer, the term of this patent is extended or adjusted under 35 U.S.C. 154(b) by 0 days.

(21) Appl. No.: 09/576,591

(22) Filed: May 22, 2000

Related U.S. Application Data (60) Provisional application No. 60/135,445, filed on May 22, 1999.

(51) Int. Cl.[7] ............................ G06F 13/20; G06F 13/28
(52) U.S. Cl. ............................ 710/22; 710/24; 710/36; 710/39; 710/43; 710/48
(58) Field of Search ............................ 710/22, 24, 36, 710/39, 43, 48

(56) References Cited

U.S. PATENT DOCUMENTS

| | | | | |
|---|---|---|---|---|
| 5,129,064 A | * | 7/1992 | Fogg et al. .................... | 703/25 |
| 5,404,550 A | * | 4/1995 | Horst .......................... | 712/14 |
| 5,561,816 A | * | 10/1996 | Mitsuhira et al. ............. | 710/22 |
| 5,721,828 A | * | 2/1998 | Frisch ......................... | 709/217 |
| 5,860,083 A | * | 1/1999 | Sukegawa .................... | 711/103 |
| 5,903,281 A | * | 5/1999 | Chen et al. .................. | 345/504 |
| 6,161,154 A | * | 12/2000 | Schultz et al. ................ | 710/56 |

\* cited by examiner

*Primary Examiner*—Rehana Perveen
(74) *Attorney, Agent, or Firm*—Myers Dawes Andras & Sherman LLP; John W. Eldredge (57) ABSTRACT

An automated direct memory access system is implemented as an advanced ATA host IC for mother board or adapter applications. The system transfers data from two independent ATA channels using the ATA Ultra-100 protocols. The ADMA implements a command chaining technique to de-couple the host command sequence from channel execution. Software builds a command chain for hardware execution. The ADMA hardware independently reads command chain requests from memory and executes the next task on the list. When the ADMA hardware completes a task, it interrupts the host in order to inform the host that the task is complete, but immediately proceeds to the next task without waiting for interrupt servicing by the host.

2 Claims, 4 Drawing Sheets

AUTOMATED DMA ENGINE FOR ATA CONTROL

This application claims the benefit of provisional application Ser. No. 60/135,445 filed May 22, 1999.

FIELD OF THE INVENTION

The present invention relates to ATA-to-peripheral device bi-directional data transfer systems, and more particularly, to an advanced ATA adapter implementing a command chaining technique to de-couple the host command sequence from channel execution.

BACKGROUND OF THE INVENTION

The performance of ATA devices has increased dramatically over the last few years, particularly following introduction of the overlapped and queued command set. However, systems using these faster devices have not exhibited all of the expected benefits. This limited performance improvement can be traced to the design and implementation of the ATA host adapters currently in use, with the problem being amplified by the design of the Standard ATA driver software used in Windows® operating systems. These drivers effectively treat ATA transfers as a single-threaded entity, with correspondingly long latencies, required to have a host system fully service interrupt requests.

There are a number of factors that contribute to the time taken by a host computer to service a I/O request. In most operating systems, register access requires a subroutine call involving considerable processor overhead. The register access sequence of actions requires seven separate PCI 8-bit I/O transfers. Each register access takes a minimum of 4 PCI clocks (120 ms at 33 MHz) plus the ATA cycle time for each transfer. In many cases, the ATA devices are set to mode 0 for command-block transfers. In mode 0, the ATA cycle time is 600 ms for each access. This time is in addition to the 120 ns required for a PCI transfer, making a total of 720 ns per register access or 5040 ns (5 us) for a complete command set up sequence. During this period, the PCI bus and the processor are unavailable for further functions.

The data transfer period depends on the ATA protocol in use, the size of the ATA adapter FIFO, the size of the host cache line, and the overall PCI bus utilization. During bus master transfers, the memory and PCI usage is interleaved with the processor's requirements. Thus, the processor is able to fetch instructions and process them within its own pipeline, concurrent with the bus-master transfer. The normal unit of transfer requested by a Microsoft O/S is 4k Bytes. For an Ultra 100 system operating on a PCI-33 bus, the minimum transfer time would be 30 us, making the command set up time a minimum of 16% of the transfer time. When the transfer is complete, the ATA device may assert an interrupt. The host shall then read the ATA status register to determine if the transfer was successful and to clear any pending interrupt. Thus, for any one transfer, there is the potential for a long period of PCI bus utilization for command transfer and the need to service an interrupt.

2 Introduction

Although the performance of ATA Devices has increased drastically over the last few years, systems using them have not shown all of the corresponding benefits. This limited performance improvement can be traced to the design and implementation of the ATA host adapters currently in use. The problem in Wintel systems is amplified by the design of the standard ATA driver used in Windows® operating systems. These drivers effectively treat ATA transfers as a single-threaded entity, with correspondingly long latencies to fully service interrupts. The ADMA is designed to address these problems and add features that will make it and ATA Devices more suitable for true multi-threading applications, such as Network server and streaming-AV applications.

The objective of the ADMA design is to drastically increase the performance of systems that use ATA Devices.

3 Normative References

The following documents contain terminology definitions, protocol descriptions, and implementation standards which must be taken into account when discussing the content of this specification. All standards are subject to revision, and parties to agreements based on this standard are encouraged to investigate the possibility of applying the most recent editions of the standards listed below, and, where applicable, tracking the draft versions of forthcoming revisions to those standards.

3.1 Industry Standard References 3.1.1 ANSI Information Technology—AT Attachment with Packet Interface-5 (ATA/ATAPI)

Published standard: AT Attachment Interface with Packet Interface Extensions (ATA/ATAPI-4), ANSI National Standard for Information Systems, #X3.317-1998

Draft standard: AT Attachment Interface with Packet Interface Extensions (ATA/ATAPI-5), Proposed Draft #T13-1321D Revision 1, ANSI National Standard for Information Systems, #X3.317-1998

3.1.2 PCI Local Bus Specification—Revision 2.2

Standard for the PCI Local Bus, published Dec. 18, 1998, by the PCI Special Interest Group (PCI SIG)

3.2 GSI Development Specifications 3.2.1 GSI Product Specification: HotPort™ External Device Interface GSI Product Specification 1646-PS-02-6. The HotPort™ External Device Interface 3.2.2 GSI Technology Specification: ATA/ATAPI Sub-Channel Implementation GSI Technology Specification 1843-PS-03-6

4 Definitions, Abbreviations, and Conventions 4.1 Definitions and Abbreviations 4.1.1 ATA Adapter The hardware that performs the interface between the ATA Host and the ATA channel. The embodiment can be an IC or plug-in adapter.

4.1.2 ATA Bus

The physical connection between an ATA Adapter and an ATA Device, consisting of conductors carrying signals.

4.1.3 ATA Channel

The ATA channel is the logical transport mechanism between the ATA host and the ATA Devices on an ATA Bus. Each channel can have two devices connected to it.

4.1.4 ATA sub-channel

A sub-channel controller can replace an ATA Device. A sub-channel controller can host further ATA channels allowing extra devices to be addressed.

4.1.5 ATA Device {ATA Spec.}

A data storage peripheral. Traditionally, a Device on the ATA interface has been a hard drive, but any form of storage device may be placed on the interface, provided that the Device adheres to this ATA standard.

4.1.6 ATA Host

Software is executed ion the host that controls the functions of the ATA-subsystem.

4.1.7 ATA subsystem

The hardware elements that include an ATA Adapter, ATA channel, and the ATA Device(s).

4.1.8 ATA-n

A shorthand reference to the standard specified in the ATA-n (or ATA/ATAPI-n, as applicable) standards document, whether published as final, circulated in draft form, or only in the planning stage.

4.1.9 ATA Standard

The current, evolving ATA/ATAPI standard. The standard specified by the draft of the ATA/ATAPI interface specification, NCITS document T13 1321D Revision xx, current at the time of the writing of this document.

4.1.10 ATA Specification

The draft of the ATA/ATAPI interface specification, NCITS document T13 1321D Revision xx current at the time of the writing of this document.

4.1.11 ATAPI (AT Attachment Packet Interface) Device

A Device which implements the Packet Command feature set.

4.1.12 bus protocol

The sequence of bus signal states, and their timings, which are required in order to transfer commands and data along a bus. There may be more than one protocol available on any one bus.

4.1.13 ATA bus release {ATA Spec.}

The act of clearing both DRQ and BSY to zero before the action requested by the command is completed, to allow the Host to select the other Device on the channel. (Applies only to Devices that implement overlap.).

4.1.14 command queue

The set of all commands for which command acceptance has occurred but command completion has not occurred. Command queuing allows the Host to issue concurrent commands to the same Device. Only commands in the Overlapped Feature Set may be queued.

4.1.15 CRC (Cyclic Redundancy Check) {ATA Spec.}

Used for the Ultra DMA protocol to check the validity of the data that has been transferred during the last Ultra DMA burst.

4.1.16 DMA (Direct Memory Access) {ATA Spec.}

A means of data transfer, between Device and Host memory, without Host processor intervention.

4.1.17 LBA (Logical Block Address) {ATA Spec.}

A mode of addressing an ATA Device according to a linear mapping of sectors.

4.1.18 Overlap {ATA Spec.}

A protocol that allows Devices that require extended command execution time to perform an ATA bus release, so that commands may be executed by another Device on the same bus.

4.1.19 PIO (Programmed Input/Output) {ATA Spec.}

A means of accessing Device registers. The term PIO is also used to describe one form of data transfers. PIO data transfers are performed by the host processor, utilizing PIO accesses to the Data Register.

4.1.20 Ultra DMA Burst{ATA Spec.}

The period from an assertion of DMACK—to the subsequent negation of DMACK—when Ultra DMA has been enabled by the Host.

4 1.21 Wintel

A shorthand reference to systems which use Intel X86 and MS Windows® architecture.

4.2 Conventions

4.2.1 Names of Registers, Words, Bytes, Bits, etc.

The names of registers, words, bytes, bits, and modes begin with uppercase letters.

In addition, register names are prefixed with the acronyms PCI, ADMA, or ATA, to indicate which of these register sets they belong to.

For example: ATA Status Register, Status Word, Bytes 0–3, Error Bit.

4.2.2 Signal Names and Signal States

Signal names are shown in all uppercase letters. All signals are either active-high or active-low signals. If a hyphen ("-") character is affixed to the end of a signal name, it indicates that the signal is an active-low signal; otherwise, the signal is active-high. An active-low signal is true when the signal is below $V_{IL}$, and it is false when the signal is above $V_{IH}$. An active-high signal is true when the signal is above $V_{IH}$, and it is false when the signal is below $V_{IL}$.

A signal is 'asserted' when it is driven by an active circuit to the true state. A signal is 'negated' when it is driven by an active circuit to the false state. A signal is 'released' when it is not actively driven to any state. Some signals have bias circuitry that pulls the signal to either a true state or a false state when no signal driver is actively asserting or negating the signal.

4.2.3 Numbers

Numbers are decimal, unless specified otherwise.

Hexadecimal numbers are shown as a string of digits, 0 through 9 or A through F, followed by 'h': e.g. '1AB7h.'

Binary numbers are shown as a string of digits, 0 or 1, followed by 'b': e.g. '10110111 b.'

4.2.4 Content Imported from Normative Specifications

Where material within this specification has been imported from another, normative, specification, it is done so for the sake of self-sufficiency of this document and the normative source is identified. (For exact references to the normative specifications cited here, see the Normative Documents section).

For example:
{PCI Spec} indicates that this item is imported from the PCI Local Bus Specification version which was current at the time when this document was written.
{ATA Spec} indicates that this item is imported from the ATA/ATAPI Specification version which was current at the time when this document was written.

5 Overview

The ADMA is an advanced ATA adapter IC for motherboard or adapter applications. It transfer data from two ATA channels using the ATA Ultra-100 protocols on PCI66 MHz bus. To fully optimize the systems throughput it implements a command chaining technique to de-couple the host command sequence from the channel execution, allowing true multitasking. The device is implemented in 0.35 micron CMOS technology and available in a 176-pin package.

5.1 Summary of Features

Legacy Compatible—Works with existing drivers.

Bus Master Transfers to and from Memory—Minimizes CPU load.

Bus Master Transfers to and from I/O—Makes direct ATA-to-peripheral transfers possible (e.g., AV transfers from disk to MPEG2 adapters without system memory usage).

Command Chaining—Maximizes system throughput, by allowing next-command execution to start while a previous-command completion interrupt is being serviced by the Host.

HotPort™ Interface—Allows low-cost connection to externally mounted ATA Devices and adds sub-channel capability.

Unsolicited Interrupt Support—Provides insertion/removal request notification for removable Devices.

Enhanced Data Integrity—Allows long-datablock transfers without degrading Ultra ATA CRC effectiveness.

PCI 2.2 Hot Plug Compliance—Allows ADMA use in Hot Plug systems.

PCI 2.2 Low-Power Compliance—Supports system low-power modes.

ATA66/100 Electrical Interface Drivers—Meets ATA for slew-control specifications over the entire specified electrical and temperature range. Reduces noise and ringing effects.

Ultra ATA 100—Supports planned Ultra ATA speedup, up to 100 MB/s per channel.

PCI 66—Operates at 66 MHz on the PCI bus.

True Dual-Channel Design—Provides fully independent channels, with no multiplexing of any pins, eliminating associated stray capacitance and noise problems.

Large (128k-Byte) Flash BIOS Support—Suitable for adapters designed for a wide variety of PCI Bus platforms, including Wintel, Apple, AS400, and others 4k-Byte Read Write FIFOs—Maximizes data throughput.

Auto Polling of IRQs—Allows efficient implementation of overlapped commands.

Up to 256 Sub-Channels per ATA Channel—Allows 512 Devices on a single ATA channel.

ADMA register reporting of PCI error conditions—Easier Driver response to exception conditions.

Large LBA Proposal Compatability—Compatible with current proposal or methods of addressing ATA Devices with capacities greater than 138GB.

JTAG—Chip and board level testing.

6 Host Overhead Reduction

There are a number of factors that contribute to the time taken by the Host to service an I/O request. This section examines the requirements of the ATA protocol and the design of Windows™ drivers, both of which contribute to the time taken to service an I/O request. ADMA command chaining is shown to drastically reduce the overhead.

6.1 ATA Protocol Requirements

To set up a command on an ATA Device, the Host will typically perform the following sequence of events:

1—Read the ATA Status Register to determine that the channel is not busy.

2—Write the ATA Device Head Register to ensure that the correct Device is selected.

3—Write the ATA Sector Count Register to indicate the number of sectors to be transferred.

4—Write the ATA Sector Number Register to load part of the LBA address.

5—Write the ATA Cylinder Low Register to load part of the LBA address.

6—Write the ATA Cylinder High Register to load part of the LBA address.

7—Write the ATA Command Register with the command to be executed.

This sequence of actions requires 7 separate PCI 8-bit I/O transfers. If the ATA Adapter is able to internally buffer these commands, the process takes a minimum of 4 PCI cycles (840 ns at 33 MHz). During this time, all processor activity and PCI activity is stopped. If the ATA adapter cannot buffer these I/O writes, the PCI bus has to wait the ATA cycle time for each transfer. In many cases, the ATA Devices are set to Mode 0 for command-block transfers. In Mode 0, the ATA cycle time is 600 ns for each access. This time is in addition to the 840 ns required for the PCI transfer, making a minimum total of 5040 ns (5 us) during which period the PCI bus and the processor are unavailable for other functions.

The data-transfer period depends on the ATA protocol in use, the size of the ATA Adapter FIFO, the size of the Host cache-line, and the overall PCI bus utilization. These factors are discussed in 7. During bus master transfers, the memory and PCI usage is interleaved with the processor's requirements. Thus the processor is able to fetch instructions and process them within its own pipeline, concurrent with a bus-master transfer. The normal unit of transfer requested by the O/S is 4k Bytes. For an Ultra 100 system operating on a PCI-66 bus, the minimum transfer time would be 40 us, making the command setup time 25% of the transfer time.

When the transfer is complete, the ATA Device will assert an interrupt. The Host then must read the ATA Status Register to determine if the transfer was successful and to clear the pending interrupt. The treatment of interrupts by the Host software driver is discussed in Section 6.2.

Thus for any one transfer there is the potential for a long period of PCI bus utilization for command transfer and the need to service an interrupt.

6.2 Windows® Driver Structure

The servicing of interrupts on Wintel systems has a dominating effect on ATA subsystem performance. The reasons for this can be explained by examining the requirements of both the ATA protocol and the Windows® driver requirements.

Figure 1:
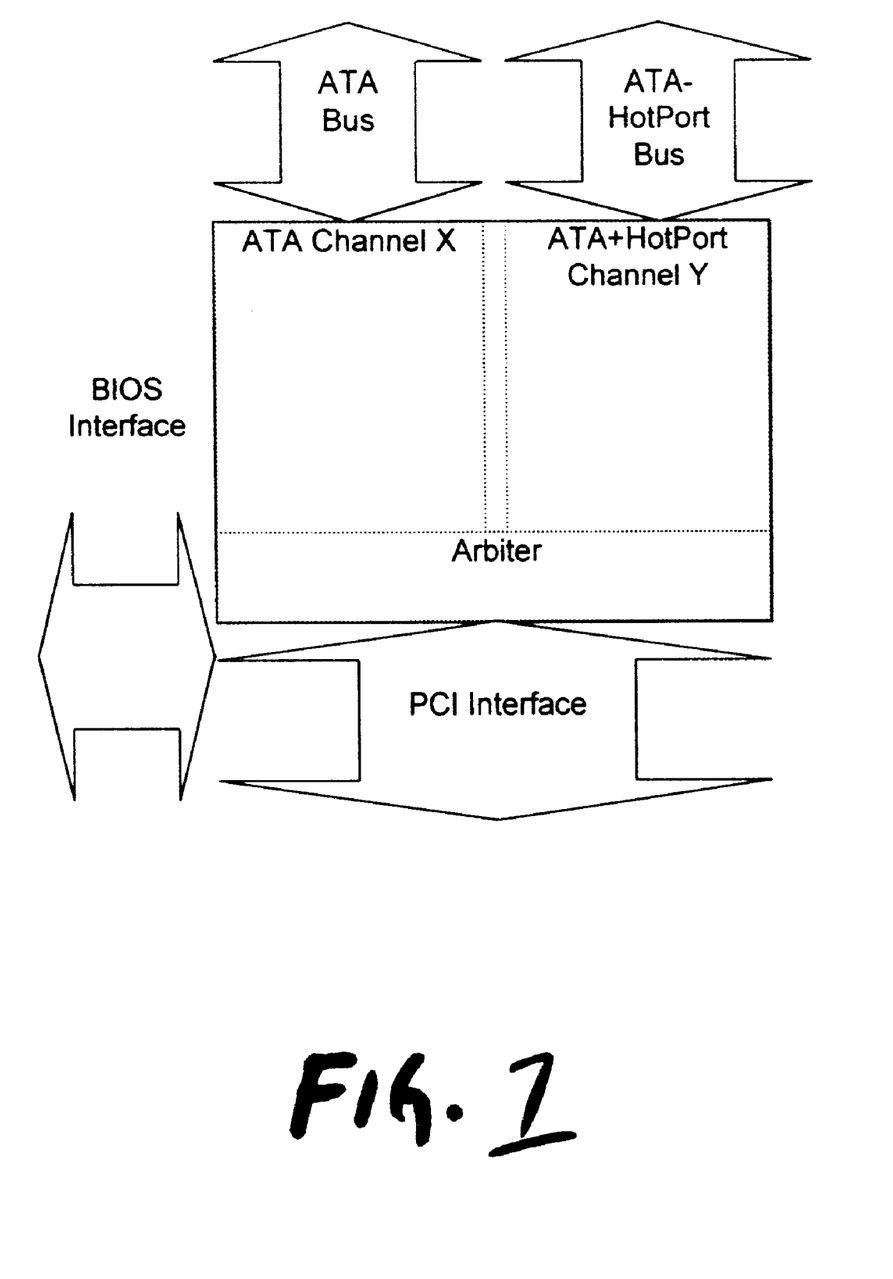
FIG. 1 is a semi-schematic block level diagram of an ADMA architecture in accordance with the invention.
Figure 2:
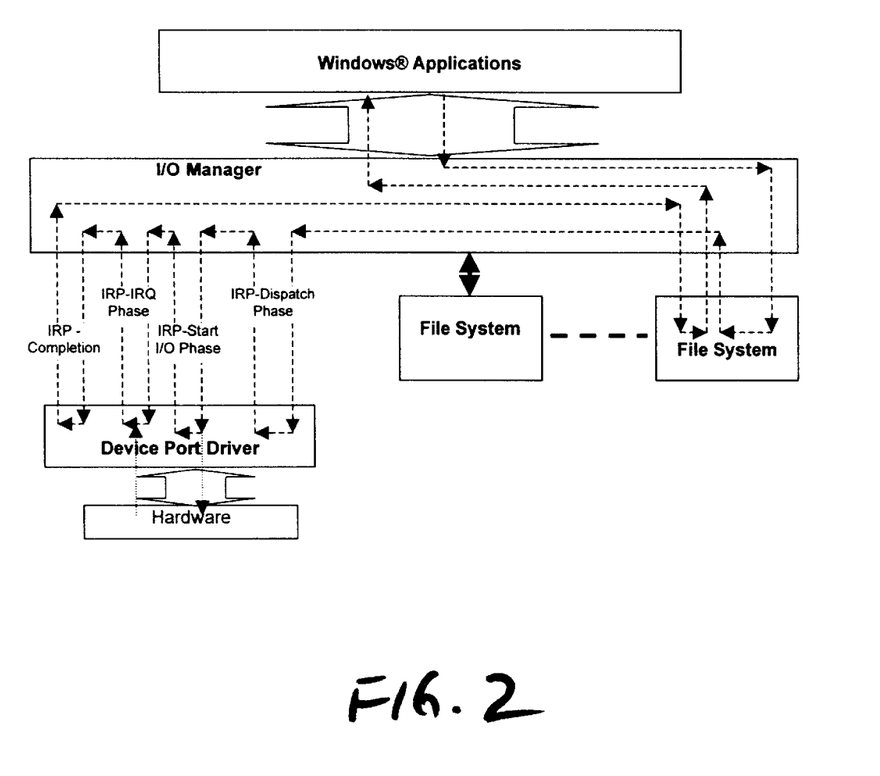
FIG. 2 is a semi-schematic block level diagram of an exemplary Windows® driver.
Figure 3:
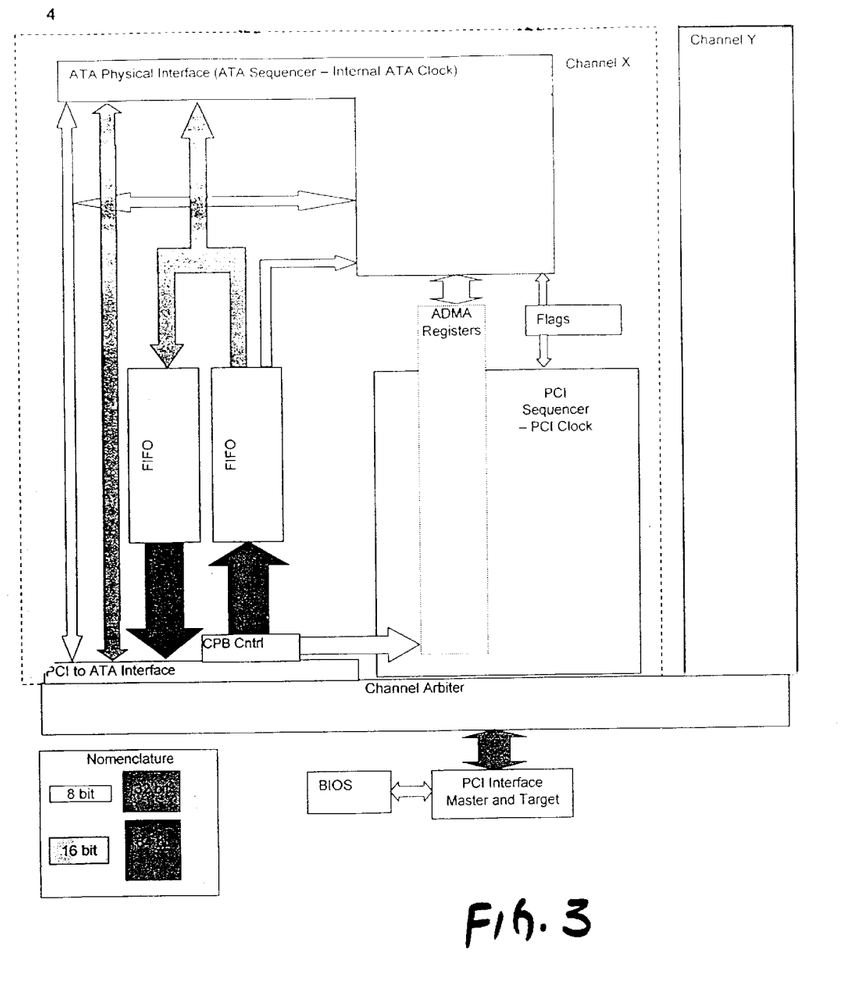
FIG. 3 is a semi-schematic block level diagram of the operational components of an ADMA system in accordance with the invention.
Figure 4:
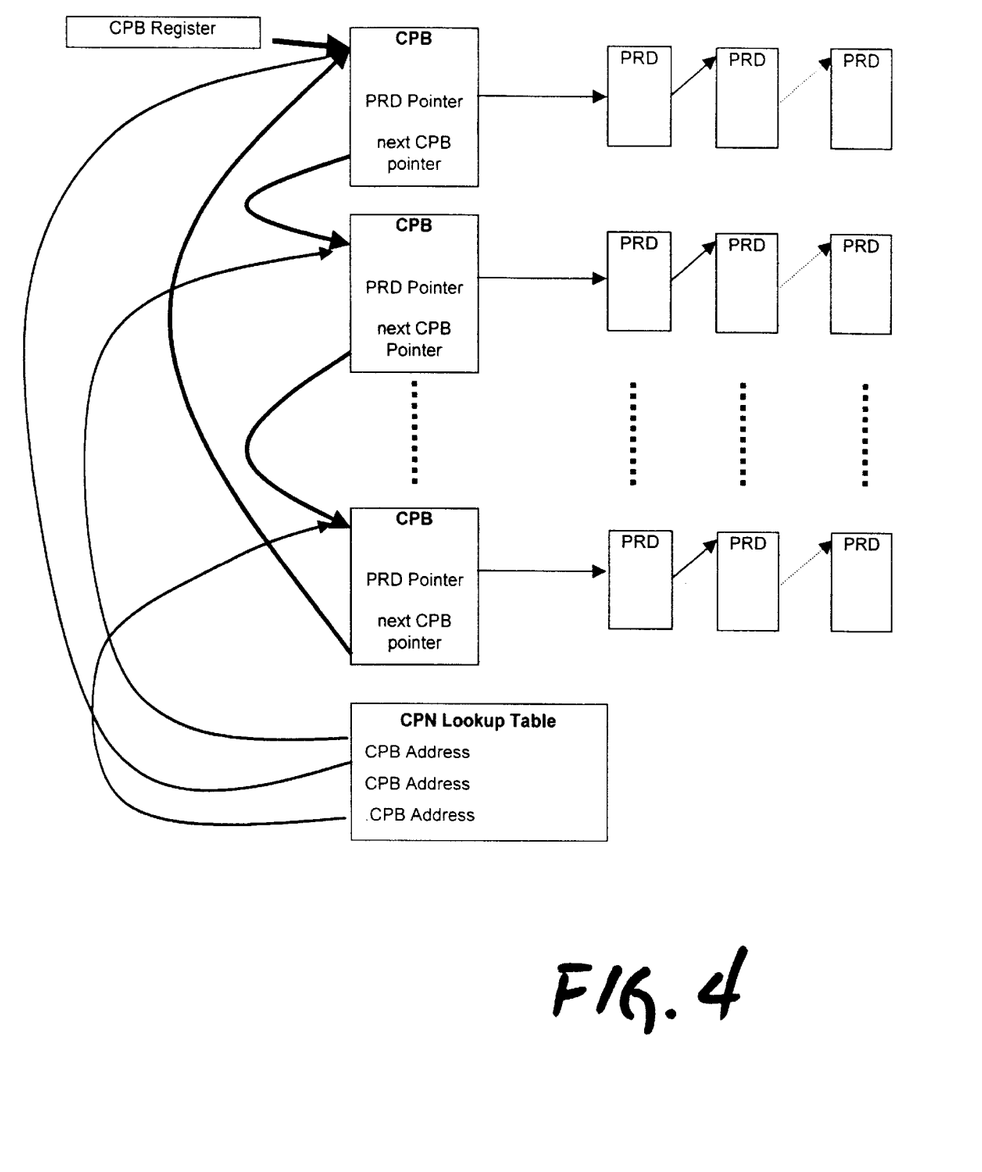
FIG. 4 is a semi-schematic block level flow diagram of ADMA memory usage illustrating the CPB chain.

FIG. 1 is a simplified illustrator of the Windows® driver structure. An application makes a request for data from the I/O Manager. The IOM then builds the request into an I/O Request Parameter block (IRP), and the IRP is passed by the IOM to various elements required to service the request. The request will be passed to the File system whose function is to determine where the data is located and add additional information request to the IRP.

The IRP is then passed back to the data manager with a request to pass it on to the driver for the Device. When the driver receives the IRP it transforms the request into a form that can be understood and executed by the hardware.

The request is processed by the driver in four phases: Dispatch, Start I/O, IRQ, and Completion.

6.2.1 Dispatch Phase

The IRP is accepted and queued.

6.2.2 Start I/O

The Driver passes the formatted information to the hardware. The IRP is updated to show that an interrupt is expected and control is passed back to the IOM.

6.2.3 IRQ

When the ATA Device asserts an interrupt the IOM has to determine where the interrupt originated from. On PCI systems, many Devices can use the same interrupt signal. The IOM has to determine which Device caused the interrupt, to do this it enters the IRQ Phase, each driver is called in turn to determine to if it has control of the interrupting Device. In this phase, the driver's only allowed actions are to reset the interrupt, store the status and return with a request indicating that it needs to be re-entered in the Completion Phase.

6.2.4 Completion Phase

During this phase the driver checks the status conditions and updates the IRP.

In standard ATA drivers the IOM can only pass another request to the driver after finishing the Completion Phase. On real systems, it can be hundreds of microseconds before the IOM re-enters the driver in the Completion Phase. If the IOM calls the driver with another IRP before the current IRP has completed its Completion Phase, the driver will reject the IRP informing the IOM that it must queue the IRP until the driver is free.

The actions of the software driver and of the hardware are closely coupled. Experience shows that the IRQ and Completion Phases can take more than 100 us to complete.

6.3 Command Chain Solution

The principle objective of command chaining is to allow the software driver and the hardware to be loosely coupled. To do this, the software can build up a list of tasks (command chain) for the hardware to complete. The hardware independently reads these requests from memory and executes the task. When the hardware completes a task, it will interrupt the Host to inform the Host that the task is complete, but will immediately proceed to the next task without waiting.

Thus, in the case of a Windows™ driver, the IOM will receive an IRP and put it onto the command chain. It will then return to the DM. If the IOM passes-in another IRP, it too will be put onto the chain. IRP requests can be added onto the chain until the driver's workspace is exhausted. Concurrent with Host request setup activity, the hardware is reading the command chain and executing requests. After each request is complete, the hardware asserts an IRQ and the IRQ Phase is entered. The driver then requests a Completion Phase for the appropriate IRPs. The ADMA does not have to wait for the IRP or the Completion Phase but can immediately continue with the next task in the chain.

6.3.1 Command Chain Performance Benefits

The overhead associated with writing the command to the Device drops from 5 us, 25% of the transfer time (Section 6.1), to 4 PCI clocks (60 ns) at PCI-66, or 0.15% of the transfer time.

The delay imposed between execution of one I/O request and initiation of the next drops from a typical 100 us to approximately 360 ns (24 PCI clocks at PCI-66).

7 Major Parameters

The features of the ADMA are designed to provide full legacy compatibility along with many new advances to drastically improve performance as well as functionality. This section describes the features and the reasons why they have been specified.

7.1 FIFO Size 7.1.1 Conclusion

All current Ultra ATA Host controller implementations use a FIFO to buffer the data between the Device and the Host. It has been observed that these FIFOs are insufficient in size to allow the continuous transfer of data. A FIFO size of 4k Bytes (plus 128 Bytes for over-run) in each direction [rough!] has been chosen for the ADMA.

The following factors have been taken into consideration when determining the size of the FIFOs used in the ADMA.

7.1.2 PCI Bus Latency

To perform a Bus Master transfer, the ADMA requests control of the PCI Bus. When this grant is requested, it can transfer data until the grant is removed or no more data is available. The time the Host takes to grant a bus control request varies, depending on the utilization of the PCI bus. This time can vary from 11 to several hundred bus clocks. Thus when the grant is given, the ADMA should have sufficient data or space available in its FIFO to be able to continuously transfer data until the grant is removed. This reduces the number of request/grant sequences required, consequently reducing bus occupancy and reducing the overall transfer time.

7.1.3 Ultra ATA Pausing

If the FIFO becomes empty or full due to the effects of PCI bus latency, the ADMA will pause the Ultra DMA transfer. Such pauses dramatically reduce the overall transfer rate and increase the transfer time. A large FIFO will reduce the likelihood of this occurrence.

7.1.4 PCI Bus Speed

The PCI bus commonly used in Wintel systems is 32-bit/33 MHz. This bus can theoretically transfer data at 133 MB/s. This speed is attained only in short bursts. Sustained bursts of 80 to 100 MB/s can be expected on most systems. It should be possible to sustain transfers from a single Ultra-66 channel. but dual Ultra-66 transfers cannot be sustained. Thus a FIFO capable of holding an average transfer will result in the least number of Ultra pauses. Single-channel transfer from Ultra-100 may be sustainable on some systems.

7.1.5 Operating System Transfer Size

The usual unit of transfer used by Windows ® Operating Systems is 4k (4096) Bytes.

7.2 PCI Bus Speed and Width

7.2.1 Conclusion

The ADMA will be a 32-bit, 66 MHz PCI device. The following factors have been taken into consideration when coming to this conclusion.

7.2.2 System requirements

Currently (1999), most systems are shipping with 33 MHz, 32-bit bus solutions. It is anticipated that, by the end of 1999, 66 MHz systems will start to become predominant in high-end systems. However, 64-bit-wide operation is not seen as being a factor for another 12 to 24 months.

7.2.3 Bus Width

As explained in Section 7.2.2, 32-bit operation is the predominant system implementation. 64-bit operation would increase performance and decrease PCI bus utilization. However, 64-bit operation would increase the external pin count, and thus cost, for no real system benefits. An increase to 64-bit operation could be an enhancement for future revisions of the ADMA device.

7.2.4 Ultra Performance

Section 7.1.4 outlines the effects of PCI performance on the ability to service the Ultra ATA devices. 33 MHz PCI buses can only maintain performance on a single Ultra ATA channel. For Ultra 100 and two-channel Ultra 66 operation, 66 MHz operation is required for optimum performance. The system will operate reliably with a 33 MHz bus.

7.3 PCI Specification

7.3.1 Conclusion

The ADMA device will conform to PCI 2.2, operating at 3.3 V or 5 V, and will be Hot Plug capable.

7.3.2 Low-Power Mode

The ADMA supports the pCLKRUN signal. When in the idle state the ADMA will release the pCLKRUN signal, this will allow the host to reduce the PCI clock to 0 Hz so reducing the power consumption of those elements of the core operating on the PCI clock. To further reduce power the ADMA supports the PCI low-power state "D2". In this state the internal clock is stopped but the register contents are maintained. Upon wake up the transition from the "D2" state to the operational "D0" state provides the time needed for the internal PLL to stabilize. Further power reductions require the removal of power to the ATA devices and thus a full initialization process. It should be noted that where this device is used on HotPort™ implementations the HotPort™ interface includes a signal that is intended to bring a system out of the "D3" state, this signal is not however passed through the ADMA.

7.3.3 Hot Plugging

A target market for the ADMA device is the low-cost server market. The device will be implemented on plug-in adapter cards. Thus the Hot Plug Specification will be followed.

7.3.4 Operating Voltage

Increasingly, PCI-based systems are using 3.3 V and 5 V signaling. It is anticipated that some systems will become 3.3 V-only. Thus the ADMA should be capable of being built into 3.3 V or 5 V systems and used on dual-mode PCI adapter cards.

The device will be a 3.3 V part with 5 V tolerance. Operation at 3.3V complies with the signal levels for ATA-4 and ATA-5.

7.4 ATA Protocol Support

7.4.1 Conclusion

The ADMA will operate in Legacy PIO Mode, DMA-Assisted PIO Mode, and Full DMA Mode.

7.4.2 ATA v Host Protocols

It is easy to confuse the terms describing the transfer protocols used in a PC system. The ADMA sits between the Host-system PCI Bus and the ATA Bus. The ADMA transfers data to and from the Host, using PCI protocols, and to and from ATA Devices, using ATA protocols. The terms PIO and DMA have meanings for both the ATA and PCI busses; however, they are not necessarily the same meaning. The protocols used on the PCI and ATA buses do not necessarily have to be the same for any one transfer.

7.4.3 PIO

For the Host, PIO is taken to mean that data is transferred between the Host and the ATA adapter by the Host reading or writing a Register in the ATA adapter using IN and OUT processor instructions. [rough!]

For the ATA bus, PIO means that data is transferred between the ATA Device and the ATA adapter by a sequence of signals on the ATA bus. The ATA adapter controls the sequence.

Host PCI-PIO is not an efficient method of data transfer. Host PIO is the legacy mode used on Wintel systems. Operation in this mode is defined as Legacy PIO.

The ATA standard defines various PIO transfer rates, the fastest of which is 16 MB/s. The ATA PIO protocol can be automated in the ADMA so that it can be used to transfer data to/from the Device while using PCI DMA from/to the Host. This method of operation is termed DMA-Assisted PIO Mode.

7.4.4 DMA

For the Host, DMA is taken to mean that data is transferred between the Host and the ATA adapter over the PCI bus, using the PCI Burst Mode protocol. Once initiated, the transfer requires no Host involvement. PCI Burst Mode DMA is the fastest method of data transfer over the ATA bus.

For the ATA bus, DMA means that data is transferred between the ATA Device and the ATA adapter by a sequence of signals on the ATA bus. The ATA adapter controls the sequence but is a different sequence from that used by ATA PIO. There are two methods of DMA defined: Multiword DMA and Ultra DMA.

7.4.4.1 ATA Multiword DMA

ATA Multiword DMA is defined to transfer data at up to 16 MB/s. This protocol has traditionally been used in conjunction with the PCI DMA protocol to provide a more efficient means of transferring data through the system. It seems that there are implementation imperfections in some ATAPI Devices. Consequently, most ATAPI host software programs use the PIO protocol.

The performance of Multiword DMA is insufficient for modern hard drives. It is likely that this protocol will be dropped in ATA-6.

7.4.4.2 Ultra-DMA

ATA Ultra-DMA is a high-speed mode of data transfer. ATA-5 defines transfer rates up to 66 MB/s, with ATA-6 slated to include a 100 MB/s rate. 32-bit ATA could increase this rate to 200 MB/s. In addition to high performance, the Ultra protocol defines the use of a CRC to validate that data has been correctly transferred.

ATA Ultra-DMA is used on all modern hard drives and is now starting to be implemented on ATAPI Devices.

7.4.5 DMA Method Implemented

Because DMA-Assisted PIO Mode equals the performance of Multiword DMA and does not have the same implementation problems on ATAPI Devices, the ADMA on supports Ultra DMA.[????] When using the ATA Ultra DMA protocol, Host transfers will be via PCI DMA. This mode is termed DMA Mode.

7.5 Operating Modes

7.5.1 Conclusion

Need three modes of operation: Legacy (power-on default), and SFF (for backward compatibility) and Command Chain Mode (for performance).

7.5.2 Legacy Modes

The basic operation of any ATA subsystem is in legacy PIO Mode. This means that the ATA adapter acts as an address decoder for the Host. All reads and writes are performed using Host I/O instructions. The only function performed by the ATA adapter is to control the signal timings of the ATA bus and to respond to the PCI signals. This mode of operation is compatible with standard BIOS code and all operating system drivers.

7.5.3 SFF Mode

The advent of PCI DMA ATA adapters introduced some new registers, features and conventions. Conforming to these legacy standards ensures compatibility with in-built operating system drivers that are DMA-aware. These registers and features are described in the SFF 8038i document. This document does not describe how the PCI adapter is to be configured; configuration is vendor specific.

7.5.4 Automatic DMA Mode

Section 6.3 describes the benefits of reduced overhead and increased throughput associated with command chains. Section 12 describes the operation in more detail.

8 ADMA Physical Definition

8.1 Pin and Package Definition

Package Type: 176-pin

Sides 1, 2, 3 & 4 progress counterclockwise around the package (as viewed from above). Within a side, the signals must be in the order shown (increasing pin numbers). Additional pins for power and ground may be inserted anywhere.

Note:

PCI signal names start with 'p'
ATA channel X signal names start with 'x'
ATA channel Y signal names start with 'y'
Hotport™ signal names start with 'xH' or 'yH'
Flash EPROM signal names start with 'm'
I=input
O=output
O=output with tristate control
B=bidirectional
C=clock input

TABLE 1

Signal Names

| Side 1-44 pins | | Side 2-44 pins | | Side 3-44 pins | | Side 4-44 pins | |
|---|---|---|---|---|---|---|---|
| PGNTn | I | pAD8 | B | | | yHRTDHn | O |
| pREQn | o | pCBE0n | B | | | yHRTHDn | I |
| pAD31 | B | pAD7 | B | xLEDn | O | yCS1n | O |
| pAD30 | B | pAD6 | B | xCS1n | O | yCS0n | O |
| pAD29 | B | pAD5 | B | xCS0 | O | yA2 | O |
| pAD28 | B | pAD4 | B | xA2 | O | yA0 | O |
| pAD27 | B | pAD3 | B | xA0 | O | yCBLID | O |
| pAD26 | B | pAD2 | B | xCBLID | I | yA1 | O |
| pAD25 | B | pAD1 | B | xA1 | O | yIRQ | I |
| pAD24 | B | pAD0 | B | xIRQ | I | yACKn | O |
| pCBE3n | B | mA6 | O | XACKn | O | yIORY | I |
| pIDSEI | B | mA5 | O | xIORY | I | yIORn | O |
| pAD23 | I | mA7 | O | xIORn | O | yIOWn | O |
| pAD22 | B | mA4 | O | xIOWn | O | yDRQ | I |
| pAD21 | B | mA12 | O | xDRQ | I | yUIRQn | I |
| pAD20 | B | mA3 | O | xUIRQn | I | yD15 | B |
| pAD19 | B | mA15 | O | xD15 | B | yD0 | B |
| pAD18 | B | mAa2 | O | xD0 | B | yD14 | B |
| pAD17 | B | mA16 | O | xD14 | B | yD1 | B |
| pAD16 | B | mA1 | O | xD1 | B | yD13 | B |
| pCBE2n | B | mWEN | O | xD13 | B | yD2 | B |
| PFRAMEn | B | mA0 | O | xD2 | B | yD12 | B |
| pIRDYn | B | mA14 | O | xD12 | B | yD3 | B |
| pTRDYn | B | mD0 | B | xD3 | B | yD11 | B |
| pDEVSELn | B | mA13 | O | xD11 | B | yD4 | B |
| pSTOPn | B | mD1 | B | xD4 | B | yD10 | B |
| pPERRn | B | mA8 | O | xD10 | B | yD5 | B |
| pSERRn | I | mD2 | B | xD5 | B | yD9 | B |
| pPAR | B | mA9 | O | xD9 | B | yD6 | B |
| pCBE1n | B | mD3 | B | xD6 | B | yD8 | B |
| pAD15 | B | mA11 | O | xD8 | B | yD7 | B |
| pAD14 | B | mD4 | B | xD7 | B | yHHPRES | O |
| pAD13 | B | mOEN | O | xRSTn | O | yRSTn | O |
| pAD12 | B | mD5 | B | XTLI | C | pCLKRUNn | O |
| pAD11 | B | mA10 | O | XTLO | C | pM66EN | O |
| pAD10 | B | mD6 | B | yLEDn | B | pCLK | C |
| pAD9 | B | mCEN | O | YHDPRES | O | pRSTn | I |
| | | mD7 | B | yHDIRn | I | | |

8.1.1 Device Signal Definitions

8.1.1.1 pGNTn

Grant {PCI Spec} Indicates to the agent that access to the bus has been granted. This is a point-to-point signal. Every master has its own pGNTn, which must be ignored while pRSTn is asserted.

8.1.1.2 pREQn

Request {PCI Spec} Indicates to the arbiter that this agent desires use of the PCI bus. This is a point-to-point signal. Every master has its own pREQn, which must be tri-stated while pRSTn is asserted.

8.1.1.3 pAD[31::00]

Address and Data {PCI Spec} Address and data are multiplexed on the same PCI pins. A bus transaction consists of an address phase followed by one or more data phases. PCI supports both read and write bursts.

8.1.1.4 pCBE[3::0]n

Bus Command and Byte Enables {PCI Spec}

8.1.1.5 pIDSEL

Initialization Device Select {PCI Spec} Used as a chip select during configuration read and write transactions.

8.1.1.6 pFRAMEn

Cycle Frame {PCI Spec} Driven by the current master to indicate the beginning and duration of an access. pFRAMEn is asserted to indicate that a bus transaction is beginning. While pFRAMEn is asserted, data transfers continue. When pFRAMEn is de-asserted, the transaction is in the final data phase or has completed.

8.1.1.7 pIRDYn
Initiator Ready {PCI Spec}
8.1.1.8 pTRDYn
Target Ready {PCI Spec}
8.1.1.9 pDEVSELn
Device Select {PCI Spec}
8.1.1.10 pSTOPn
Stop {PCI Spec}
8.1.1.11 pPERRn
Parity Error {PCI Spec}
8.1.1.12 pSERRn
System Error {PCI Spec}
8.1.1.13 pPAR
Parity {PCI Spec}
8.1.1.14 mA[16::0]
8.1.1.15 mWEN
8.1.1.16 mD[7::0]
8.1.1.17 mOEN
8.1.1.18 mCEN
8.1.1.19 x/yLEDn
8.1.1.20 x/yHDPRES
8.1.1.21 x/yHDIRn
8.1.1.22 x/yHRTDHn
8.1.1.23 x/yHRTHDn
8.1.1.24 x/yCS1n
8.1.1.25 x/yCS0n
8.1.1.26 x/yA[2:0]
8.1.1.27 x/yIRQ
8.1.1.28 x/yACKn
8.1.1.29 x/yIORY
8.1.1.30 x/yIORn
8.1.1.31 x/yIOWn
8.1.1.32 x/yDRQ
8.1.1.33 x/yUIRQn
8.1.1.34 x/yD[15::00]
8.1.1.35 x/yHHPRES
8.1.1.36 x/yRSTn
8.1.1.37 pCLK
Clock {PCI Spec} Provides timing for all transactions on PCI and is an input to every PCI device. All other PCI signals, except RSTn, INTAn, INTCn, and INTDn, are sampled on the rising edge of CLK and all other timing parameters are defined with respect to this edge.
8.1.1.38 pRSTn
Reset {PCI Spec} Used to bring PCI-specific registers, sequencers, and signals to a constant state.
8.2 Electrical Characteristics
8.3 Environmental Constraints
Operating Temperature: 0° to 70° C. (ADMA chip case temperature)
9 Operation
9.1 ATA Protocol Support
The ADMA will operate in Legacy PIO Mode, DMA-Assisted PIO Mode, and Full DMA Mode. These modes are described in Section 7.4.
9.2 Modes of Operation
Each channel can operate in one of 3 modes defined by the setting of MODE in the ADMA Channel Register as written by the device driver: Legacy PIO Mode, DMA-Assisted PIO Mode, or Full DMA Mode 9.3 PIO Legacy Mode.
The Auto PIO timing generator has one set of timings for 8-bit ATA Command Register transfers and two for 16-bit ATA Data Register transfers (one for each Device on the cable). ATA Command Register timings reflect the slower Device on the cable and can be Modes 0–4. Data timings can be Modes 0–4.
PIO reads are performed within the PCI cycle, so that TRDYn is not asserted until the PIO data is available. PIO writes can assert TRDYn immediately provided the previous PIO write is complete.
9.4 SFF Legacy Mode
The Auto PIO timing generator is the same as in PIO Legacy Mode. ATA Command Register transfers are the same as in PIO Legacy Mode. ATA Data transfers pass through one of the FIFOs, thereby decoupling the ATA cycles from the PCI cycles. Timing is controlled either by the Ultra DMA timing generator (Modes 0–5) or the Auto PIO timing generator.
PRD table entries are read from memory into internal counting registers, using PCI Master Mode. The entries define the current transfer address and length. There can be more than one entry reflecting fragmentation of physical memory by the x86 paging registers.
PCI Master Mode is used to transfer bursts of data (controlled by the current PRD table entry) to or from memory. Synchronization is controlled by FIFO control signals (empty, full etc). In Auto PIO a Read Ahead Register is necessary to prevent the host from reading too much data, as the length counter in the current PRD entry is counting PCI transfers, not ATA transfers. In UltraDMA, the disk signals the end of the transfer by de-asserting DMARQ.
In Auto PIO, intermediate interrupts between blocks of data are not passed to the PCI INTAn.
PCI Master Mode is also used to transfer PRD table entries into the internal registers.
The PRD table structure, PRD Address Register, DMA Command Register, and DMA Status Register are described in Section( ).
9.5 Auto DMA Mode
Auto DMA Mode enables chains of ATA transfers to be defined in memory and the controller to execute them without assistance from the device driver. There will typically still be one interrupt per transfer to indicate completion, but the hardware does not have to wait for it to be serviced before starting the next transfer.
The Command Parameter Block Table is a singly linked circular table, with each entry containing of a list of ATA registers and the data to be written to them and whether they should be read at transfer completion. Each entry also contains a pointer to the PRD table for this transfer and a pointer to the next table entry.
The device driver formats the table, writes the start address into the CPB Address Register, and signals the hardware to start.
The hardware does a PCI Master Mode burst to load the PRD Address Register, write the ATA registers with the given data, and start the transfer. The sequence of events within the transfer is exactly the same as SFF Legacy Mode (unless Command Overlap and Queuing are enabled). At the completion of the transfer, the specified ATA registers are read and the status is updated in the memory image of the current CPB entry. A PCI INTAn is generated and, if no errors occurred, the next CPB table entry is read and executed.

The Command Parameter Block Table can contain entries for each Device on the cable, with the order of execution defined by the device driver.

9.6 Command Overlap and Queueing

If the Devices support Command Overlap and Queuing, the sequence becomes more complicated. Only certain commands may be overlapped or queued. On each such command a 5-bit tag value is written into one of the ATA registers. The command may complete as above or the Device may interrupt with status.

"Released". In this case, the hardware proceeds to the next CPB entry (which may be for the other Device) and executes it. No PCI INTAn is generated.

In this way, queues of commands can be written to one or both Devices.

If overlapped commands are written to both Devices, the CPB table should include a Channel Command to initiate device polling. When a Device is ready to transfer data for any one of the queued commands, it interrupts with status "Service". In this case the hardware searches for the CPB table entry with the matching tag, sets up the registers to define PRD Address from the CPB entry, and issues a "Service" command to start the transfer.

No PCI INTAn is generated.

10 PCI Registers 10.1 PCI Configuration Header Registers

The controller implements a subset of the standard type 00h configuration header register set. All registers have the standard meaning as defined in the PCI specification issue 2.1. The registers actually implemented and device-specific values are described below. Fields marked reserved are all zeros and read only.

TABLE 2

PCI Configuration Registers

| Byte Offset | Bits 31–24 | Bits 23–16 | Bits 15–8 | Bits 7–0 |
|---|---|---|---|---|
| 00 h | Device ID | | Vendor ID | |
| 04 h | Status | | Command | |
| 08 h | Class Code | | | Revision |
| 0 ch | Reserved | Header Type | Latency Timer | Cache Line Size |
| 10 h | Base Address 0 | | | |
| 14 h | Base Address 1 | | | |
| 18 h | Base Address 2 | | | |
| 1 ch | Base Address 3 | | | |
| 20 h | Base Address 4 | | | |
| 24 h | Reserved | | | |
| 28 h | Reserved | | | |
| 2 ch | Subsystem ID | | Subsystem Vendor ID | |
| 30 h | Expansion ROM Base Address | | | |
| 34 h | Reserved | | | Capabilities Pointer |
| 38 h | Reserved | | | |
| 3 ch | Max Latency | Min Grant | Interrupt Pin | Interrupt Line |

10.1.1 PCI Vendor ID
  Address offset 00h
  Default Value ????h
  Attribute Read Only
  Size 16 bits 10.1.2 PCI Device ID
  Address offset 02h
  Default Value 1763h
  Attribute Read Only
  Size 16 bits 10.1.3 PCI Command Register
  Address Offset 04h
  Default Value 0000h
  Attribute Read/Write
  Size 16 bits

TABLE 3

PCI Command Register

| Bit | Description |
|---|---|
| 0 | Target I/O enable. A value of 0 disables Base Address Registers 0–4. |
| 1 | Target ROM enable. A value of 0 disables the Expansion ROM Base Address Register. |
| 2 | Master enable. A value of 0 disables the Master mode function of the controller. |
| 5–3 | Reserved |
| 6 | Parity check enable. A value of 0 causes parity errors to be ignored |
| 15–7 | Reserved |

10.1.4 PCI Status Register
  Address Offset 06h
  Default Value 0210h
  Attribute Read/Clear
  Size 16 bits

TABLE 4

PCI Status Register

| Bit | Description |
|---|---|
| 3–0 | Reserved |
| 4 | Capabilities Enable |
| 5 | Set to one to indicate 66 MHz-Capable. |
| 7–6 | Reserved |
| 8 | Data Parity error detected |
| 10–9 | DEVSEL timing .01 b = Medium ??. These bits are read only |
| 11 | Signaled target abort |
| 12 | Received target abort |
| 13 | Received master abort |
| 14 | Reserved |
| 15 | Detected parity error |

10.1.5 PCI Revision
  Address Offset 08h
  Default Value 00h
  Attribute Read only
  Size 8 bits 10.1.6 PCI Class Code
  Address Offset 09h
  Default Value 010180h
  Attribute Read only
  Size 24 bits 10.1.7 PCI Cache Line Size
  Address Offset 0ch
  Default Value 00h
  Attribute Read/Write
  Size 8 bits 10.1.8 PCI Latency Timer
   Address Offset 0dh
   Default Value 00h
   Attribute Read/Write
   Size 8 bits
10.1.9 PCI Header Type
   Address Offset 0eh
   Default Value 00h
   Attribute Read only
   Size 8 bits
10.1.10 PCI Base Address Registers (BAR)
   All the Base Address Registers have Bit 0 hard-wired to 1 to indicate I/O space.
10.1.10.1 PCI Base Address 0
   This is the base address for the command block registers for ATA channel X.
   Address Offset 10h
   Default Value 000001f1h
   Attribute Bits 31-3 Read Write. Bits 2-0 Read only.
   Size 32 bits
10.1.10.2 PCI Base Address 1
   This is the base address for the control registers for ATA channel X. Note that, because of the d word alignment of PCI, the Device Control and Alternate Status Registers are at offset 02h from this base. For example, to put those registers at address 3f6h, this register must be set to 3f4h (+Bit 0).
   Address Offset 14h
   Default Value 000003f5h
   Attribute Bits 31-03, Read Write. Bits 2-0, Read only.
   Size 32 bits
10.1.10.3 PCI Base Address 2
   This is the base address for the command block registers for ATA channel Y. Address Offset 18h
   Default Value 00000171h
   Attribute Bits 31-03, Read Write. Bits 2-0, Read only.
   Size 32 bits
10.1.10.4 PCI Base Address 3
   This is the base address for the control registers for ATA channel Y.
   Address Offset 1ch
   Default Value 00000375h
   Attribute Bits 31-03, Read Write. Bits 2-0, Read only.
   Size 32 bits
10.1.10.5 PCI Base Address 4
   This is the base address for the ADMA registers.
   Address Offset 20h
   Default Value 00000001h
   Attribute Bits 31-04, Read Write. Bits 3-0, Read only
   Size 32 bits
10.1.11 PCI Subsystem Vendor ID
   Address Offset 2ch
   Default Value ????
   Attribute Read only
   Size 16 bits
10.1.12 PCI Sub-System ID
   Address Offset 2eh
   Default Value ????
   Attribute Read Only
   Size 16 bits 10.1.13 PCI Expansion ROM Base Address
   Address Offset 30h
   Default Value 000d0000h
   Attribute Bits 31-16, Read Write. Bits 15-01, Read only. Bit 0, Read Write
   Size 32 bits
10.1.14 PCI Capability Pointer
   Address Offset 34h
   Default Value 44h
   Attribute Read Only
   Size 8 bits
10.1.15 PCI Interrupt Line
   Address Offset, 3ch
   Default Value 00h
   Attribute Read Write
   Size 8 bits
10.1.16 PCI Interrupt pin
   Address Offset 3dh
   Default Value 01h
   Attribute Read only
   Size 8 bits
10.1.17 PCI Minimum Grant
   Address Offset 3eh
   Default Value 10h ?? (corresponds to 4 microseconds) ??
   Attribute Read only
   Size 8 bits
10.1.18 PCI Maximum Latency
   Address Offset 3fh
   Default Value ??h
   Attribute Read only
   Size 8 bits
10.1.19 PCI Timeout Registers
   Address Offset 40,41h
   Size 8 bits each
   These are part of the Phoenix PCI core.
11 SFF Mode
11.1 ADMA Registers
   The bus mastering function uses 16 bytes of I/O space (8 bytes per channel). All Host registers can be accessed as byte, word or d word entities. The description of these registers follows.

TABLE 5

ADMA Registers

| Offset from base address | Register | Access Mode |
| --- | --- | --- |
| 00 h | Host Command-primary channel | R/W |
| 01 h | Reserved | |
| 02 h | Host Status-primary channel | R/W/C |
| 03 h | Reserved | |
| 04 h–07 h | PRD Table Address-primary channel | R/W |
| 08 h | Host Command-secondary channel | R/W |
| 09 h | Reserved | |
| 0 ah | Host Status-secondary channel | R/W/C |
| 0 bh | Reserved | |
| 0 ch-0 fh | PRD Table Address-secondary channel | R/W |

11.2 ADMA Command Register.
   Address offset, Primary channel: Base+00h
   Address offset, Secondary channel: Base+08h Default value 00h
Attribute Read/Write
Size 8 bits

TABLE 6

ADMA Command Register

| Bit | Description |
|---|---|
| 7:4 | Reserved; will return 0 on reads |
| 3 | R/W Control. This bit defines the direction of the bus master data transfer When 0, PCI reads (ATA writes) are performed When 1, PCI writes (ATA reads) are performed. This bit must not be changed while Bit 0 is 1. |
| 2:1 | Reserved-will return 0 on reads |
| 0 | Start Bit. This bit enables bus master transfers. The transfer starts when this bit changes from 0 to 1. This bit shall be cleared to zero by the Host software after the transfer is complete. Transfers can be aborted by clearing this bit, but data may be lost and the transfer cannot be resumed. |

11.3 ADMA Status Register.

Address offset, Primary Channel: Base+02h

Address offset, Secondary Channel: Base+0ah

Default value 00h

Attribute Read/Write/Clear

Size 8 bits

TABLE 7

ADMA Status Register

| Bit | Read | Write | Clear | Description |
|---|---|---|---|---|
| 7 | X | | | Cleared to zero to indicate concurrent channel operation. (In simplex implementations, this bit is set to one). |
| 6 | X | | | Device 1, DMA capable. This bit reflects the state of Bit 4. |
| 5 | X | | | Device 0, DMA capable. This bit reflects the sate of Bit 3. |
| 4 | X | X | | Device 1. Ultra DMA capable. This bit can be set by initializing software to indicate that the drive is capable of DMA transfers and has been initialized for optimum performance |
| 3 | X | X | | Device 0, Ultra DMA capable. |
| 2 | X | | X | Interrupt-This bit is set by the rising edge of the IDE interrupt line. This bit can be cleared by writing a 1 to it. When this bit is 1, all data has been transferred successfully. |
| 1 | X | | X | Error-This bit is set when the controller encounters an error transferring data. This bit can be cleared by writing a 1 to it. Error details are in the ATA Device Status Register or in the PCI Status Register. |
| 0 | X | | | Active-This bit is set when the Start Bit of the Host Command Register is set to 1. This bit is cleared when the last PRD is exhausted or the Start Bit is cleared to 0. When this bit is 0, all data has been transferred successfully, unless the command was aborted. |

11.4 ADMA PRD Table Address Register

Address offset, Primary Channel: Base+04h

Address offset, Secondary Channel: Base+0ch

Default value 00000000h

Attribute Read/Write

Size 32 bits

The PRD table must not cross a 64K boundary in memory.

TABLE 8

ADMA PRD Address Register

| Bit | Description |
|---|---|
| 31:2 | Base address of PRD table. Corresponds to D[31:2]. Must be dword-aligned. |
| 1:0 | Set to zero |

11.4.1 Physical Region Descriptor Table

Before the controller starts a Master mode transfer, it is given a pointer to a Physical Region Descriptor Table. This table contains one or more entries called Physical Region Descriptors (PRDs), which describe areas of memory that are involved in the transfer. The table must be aligned on a d word boundary and the table must not cross a 64K boundary in memory. The PRD Table must be contiguous in physical memory.

11.4.2 Physical Region Descriptor

Each Physical Region Descriptor (PRD) describes a contiguous region of memory involved in the transfer. The controller reads each PRD in turn and transfers data to or from the PRD-associated memory block, until the ATA Device interrupts to indicate the end of the transfer. If the current PRD space is exhausted, the controller reads the next PRD and continues.

If the last PRD space is exhausted and the ATA Device has not interruputed the controller indicates an error condition in its Status Register.

Every PRD is 8 bytes in length. Bytes 0 through 3 specify the 32-bit start address of a contiguous region of memory aligned to a d word boundary. Bytes 4 and 5 indicate the length of the region in bytes (a value of 0 indicates 64K). Byte 6 is reserved. Bit 7 of Byte 7 is cleared to zero for all PRD entries in the table, except the for the last entry, where Bit 7 is set to one.

TABLE 9

Physical Region Descriptor (PRD).

| 31 | | 1 | 0 |
|---|---|---|---|
| | Memory Region Physical Base Address [31:2] | 0 | 0 |
| EOT | Reserved [31:16]   Byte Count [15:2] | 0 | 0 |

11.5 Typical Programming Sequence

To initiate a bus master transfer between memory and an ATA Ultra DMA capable Device, the following steps are required.

1. Software prepares a PRD table in memory, starting on a dword boundary. Any number of 8 byte PRDs may be used, provided the table does not span a 64K boundary. The EOT Bit must be set in the last PRD. The total size of the PRD regions should be equal to or greater than the transfer size.
2. Software writes the start address of the PRD table into the Host PRD Table Address Register for the appropriate channel. Software defines the direction by writing Bit 3 of the Host Command Register and clears Bits 1 and 2 in Host Status Register.
3. Software writes the appropriate DMA command and parameters to the registers of the ATA Device.

4. Software starts the transfer by writing a 1 to Host Command Register, Bit 0, preserving the state of Bit 3.
5. The controller transfers data between the ATA Device and memory, responding to DMA requests from the Device.
6. At the end of the transfer, the ATA Device asserts its interrupt line. The controller sets Bit 2 and clears Bit 0 of the Host Status Register and asserts the PCI interrupt.
7. In response to the interrupt, software clears Bit 0 of the Host Command Register. It reads the Host Status Register and the ATA Device Status Register to determine if the transfer was successful.

11.6 Data Synchronization

When responding to the PCI interrupt or at the expiry of a time out period, the device driver must read the Host Status Register. If Bit 2 is set, then the ATA Device caused an interrupt, so all data transfer is complete. If Bit 2 is not set, then the ATA Device did not generate an interrupt, so the state of the transfer is unknown.

The controller guarantees that, when the PCI interrupt is generated in response to the ATA interrupt, all data transfer to or from the Device has been completed.

If the controller runs out of PRD space before the transfer is complete or encounters an error (such as a PCI target abort), it will not set Bit 2 of the Host Status Register or generate a PCI interrupt. In this case, the device driver shall be activated by a timeout.

11.7 Status bit Interpretation

The following table describes how to interpret Bit 2 and Bit 0 of the Host Status Register after a DMA transfer has been started.

TABLE 10

PRD Status bit Interpretation

| Bit 2 | Bit 0 | Description |
|---|---|---|
| 0 | 1 | DMA transfer is in progress. No ATA interrupt has been generated. |
| 1 | 0 | DMA transfer is complete. ATA interrupt has been generated. Controller exhausted its PRD table. This is the normal case. |
| 1 | 1 | DMA transfer is complete. ATA interrupt has been generated. Controller did not exhaust its PRD table. This is not an error but the PRD table was larger than necessary. |
| 0 | 0 | DMA transfer did not complete. This is an error condition. If Bit 1 of the Host Status Register is not set, the controller ran out of PRD space. Otherwise, the reason may be in the PCI Status Register or the ATA Device Status Register. |

If the DMA transfer did not complete, before attempting to recover from the error, the device driver must solve the problem of restoring the ATA Device to a state where it can respond to commands. The ATA Device may well be stuck with its DMARQ asserted, expecting more data to be transferred.

12 Auto DMA Mode

In Auto DMA Mode, the ADMA reads-in from host memory a command set held in the command chain. Command set are held in a data structure termed a Command Parameter Block (CPB). Control and status of the ADMA is maintained through the Chain Register. A chain of CPBs can be created in memory. This is a circular chain with each CPB pointing to the next CPB. The ADMA maintains a double-word register that points to the head of the chain. Within each CPB there is a pointer to the Physical Region Descriptor (PRD). The PRD is a structure that defines the memory locations where the data is to be written to or read from.

12.1 Command Parameter Block

The CPB is a block of parameters and commands for the ADMA and, indirectly, for the ATA channel. All transfers to and from the CPB are 32 bits wide. Any unused space is zero-filled.

13 Ultra DMA Timings 13.1 Ultra DMA Data Burst Timing Requirements

The following table includes a proposed timing for the Mode 5 operation (Ultra-100)

TABLE 11

Ultra DMA Data Burst Timing Requirements

| Signal Name | Mode 0 (ns) | | Mode 1 (ns) | | Mode 2 (ns) | | Mode 3 (ns) | | Mode 4 (ns) | | Mode 5 (ns) | | Comment |
|---|---|---|---|---|---|---|---|---|---|---|---|---|---|
| | Min | Max | Min | max | min | max | min | max | min | Max | Min | Max | (see Notes 1 and 2) |
| $T_{2CYCTYP}$ | 240 | | 160 | | 120 | | 90 | | 60 | | 40 | | Typical sustained average two-cycle time |
| $T_{CYC}$ | 112 | | 73 | | 54 | | 39 | | 25 | | 18 | | Cycle time allowing for asymmetry and clock variations (from STROBE edge to STROBE edge) |
| $T_{2CYC}$ | 230 | | 154 | | 115 | | 86 | | 57 | | 39 | | Two-cycle time allowing for clock variations (from rising edge to next rising edge or from falling edge to next falling edge - of STROBE) |
| $T_{DS}$ | 15 | | 10 | | 7 | | 7 | | 5 | | 3 | | Data setup time at recipient (see note 4) |
| $t_{DH}$ | 5 | | 5 | | 5 | | 5 | | 5 | | 1 | | Data hold time at recipient (see note 4) |
| $t_{DVS}$ | 70 | | 48 | | 30 | | 20 | | 6 | | 5 | | Data valid setup time at sender (from data valid until STROBE edge) (see Note 5) |
| $t_{DVH}$ | 6 | | 6 | | 6 | | 6 | | 6 | | 2 | | Data valid hold time at sender (from STROBE edge until data may become invalid) (see Note 5) |
| $t_{FS}$ | 0 | 230 | 0 | 200 | 0 | 170 | 0 | 130 | 0 | 120 | 0 | 120 | First STROBE time (for device to first negate DSTROBE from STOP during a data in burst) |
| $t_{LI}$ | 0 | 150 | 0 | 150 | 0 | 150 | 0 | 100 | 0 | 100 | 0 | 100 | Limited interlock time (see Note 3) |
| $t_{MLI}$ | 20 | | 20 | | 20 | | 20 | | 20 | | 20 | | Interlock time with minimum (see Note 3) |

TABLE 11-continued

Ultra DMA Data Burst Timing Requirements

| Signal Name | Mode 0 (ns) Min | Mode 0 (ns) Max | Mode 1 (ns) Min | Mode 1 (ns) max | Mode 2 (ns) min | Mode 2 (ns) max | Mode 3 (ns) min | Mode 3 (ns) max | Mode 4 (ns) min | Mode 4 (ns) Max | Mode 5 (ns) Min | Mode 5 (ns) Max | Comment (see Notes 1 and 2) |
|---|---|---|---|---|---|---|---|---|---|---|---|---|---|
| $t_{UI}$ | 0 | | 0 | | 0 | | 0 | | 0 | | 0 | | Unlimited interlock time (see Note 3) |
| $t_{AZ}$ | | 10 | | 10 | | 10 | | 10 | | 10 | | 10 | Maximum time allowed for output drivers to release (from asserted or negated) |
| $t_{ZAH}$ | 20 | | 20 | | 20 | | 20 | | 20 | | 20 | | Minimum delay time required for output |
| $t_{ZAD}$ | 0 | | 0 | | 0 | | 0 | | 0 | | 0 | | Drivers to assert or negate (from released) |
| $t_{ENV}$ | 20 | 70 | 20 | 70 | 20 | 70 | 20 | 55 | 20 | 55 | 20 | 35 | Envelope time (from DMACK- to STOP and HDMARDY- during data in burst initiation and from DMACK to STOP during data out burst initiation) |
| $t_{SR}$ | | 50 | | 30 | | 20 | | NA | | NA | | NA | STROBE-to-DMARDY- time (if DMARDY- is negated before this long after STROBE edge recipient shall receive no more than 1 additional data word) |
| $t_{RFS}$ | | 75 | | 70 | | 60 | | 60 | | 60 | | 60 | Ready-to-final-STROBE time (no STROBE edges shall be sent this long after negation of DMARDY-) |
| $t_{RP}$ | 160 | | 125 | | 100 | | 100 | | 100 | | 100 | | Ready-to-pause time (that recipient shall wait to pause after negating DMARDY-) |
| $t_{IORDYZ}$ | | 20 | | 20 | | 20 | | 20 | | 20 | | 20 | Maximum time before releasing IORDY |
| $t_{ZIORDY}$ | 0 | | 0 | | 0 | | 0 | | 0 | | 0 | | Minimum time before driving IORDY (see note 6) |
| $t_{ACK}$ | 20 | | 20 | | 20 | | 20 | | 20 | | 20 | | Setup and hold times for DMACK- (before assertion or negation) |
| $t_{SS}$ | 50 | | 50 | | 50 | | 50 | | 50 | | 50 | | Time from STROBE edge to negation of DMARQ or assertion of STOP (when sender stops a burst) |

NOTES -
1 Timing parameters shall be measured at the connector of the sender or receiver to which the parameter applies. For example, the sender shall stop generating STROBE edges $t_{RFS}$ after the negation of DMARDY-. Both STROBE and DMARDY- timing measurements are taken at the connector of the sender
2 All timing measurement switching points low to high and high to low) shall be taken at 1.5 V
3 $t_{UI}$, $t_{MLI}$ and $t_{LI}$ indicate sender-to-recipient or recipient-to-sender interlocks, i.e., one agent (either sender or recipient) is waiting for the other agent to respond with a signal before proceeding. $T_{UI}$ is an unlimited interlock that has no maximum time value. $t_{MLI}$ is a limited time-out that has a defined minimum $t_{LI}$ is a limited time-out that has a defined maximum.
4 Special cabling shall be required in order to meet data setup ($t_{DS}$) and data hold ($t_{DH}$) times in Modes 3 and 4
5 Timing for $t_{DVS}$ and $t_{DVH}$ shall be met for all capacitive loads from 15–40 pf. where all signals have the same capacitive load value.
6 $t_{ZIORDY}$ has no maximum and may be greater than $t_{ENV}$, since the device has a pull-up on IORDY-, giving it a known state when released

TABLE 12

CPB Structure

| Double Word | Byte | Bits | Value/Range | Description |
|---|---|---|---|---|
| 0 | | | | Address Fields |
| | 0 | 0–7 | 0–255 | ADMA Sub-channel Number |
| | 1 | 0 | 0/1 | Bit 0 = ATA Device Number on the channel |
| | | 1 | 0/1 | Bit 1 = Cleared to zero indicates non-queued command; set to one indicates queued command sequence. |
| | | 2 | 0 | Bit 2 = Reserved; shall be set to zero. |
| | | 3–7 | 0/1 | Bit 3–7 = ATA Tag if Bit 1 set to one; else reserved. |
| | 2 | 0–2 | 0–4 | Bit 0–2 Command Block PIO Mode (Modes 0–4) |
| | | 3–7 | 0 h | Reserved |
| | 3 | 0–1 | 0–3 | Device Data Transfer method |
| | | 2–3 | 016 | Device Data Transfer Mode |
| | | 4 | 0/1 | Shall be cleared to zero to indicate that Double Word 3 contains a PRD Address. Shall be set to one to indicate that Double Word 3 contains an I/O address for the transfer. |
| | | 3–7 | 0 | Reserved |
| 1 | 0–3 | 4 | Valid Memory Address | Memory Address of the Next CPB. |
| 2 | | | | Command and Information Fields |

TABLE 12-continued

CPB Structure

| Double Word | Byte | Bits | Value/Range | Description |
|---|---|---|---|---|
| | 0 | 0–7 | Variable | ADMA Command Byte (see description) |
| | 1 | 0–7 | 0 h-FFh | CPB ID |
| | 2–3 | 0–15 | Variable | ADMA Status Word |
| | 3 | 0–7 | Variable | ADMA Chain Byte |
| 3 | 0–3 | 4 | Valid Memory Address | PRD or I/O Address |
| 4 | 0–1 | 2 | Variable | ATA Command Data-See description |
| | 2–3 | 2 | Variable | ATA Command Data-See description |
| . | . | . | . | . |
| . | . | . | . | . |
| . | . | . | . | . |
| n | 0–1 | 2 | Variable | ATA Command Data-See description |
| | 2–3 | 2 | Variable | ATA Command Data-See description |

13.1.1 Address Fields (Double Word 0)

13.1.1.1 ADMA Sub-channel Number (Byte 0)

00h indicates the base channel, 01h–FFh are valid sub-channel addresses. 00h is the power on and reset default value.

Sub-channel addresses are changes using channel commands. These commands are snooped by the ADMA channel command unit. The currently selected sub-channel number is maintained by that unit. A CPB that contains a sub-channel command changing the current sub-channel will have the ADMA sub-channels number set to the current sub-channel. The next CPB will address the new sub-channel number.

13.1.1.2 ATA Device ID (Byte 1, Bit 0)

This bit cleared to zero indicates that the command sequence is for device zero on the currently selected channel. This bit set to one indicates that Device 1 is the selected device on the currently selected Channel.

The command sequence must start with a write to the ATA Device Head Register. The Device Bit in this write and any other Device Head Register write within the command sequence of a CPB must correspond to the setting of the ADMA Device ID Bit. I. If the bits do not correspond the CPB will be aborted and the ADMA will halt with an error status.

13.1.1.3 Overlap/Queue Flag (Byte 1, Bit 1)

This bit is set to one to indicate that the command set contains an Overlapped command. This bit being cleared to zero indicates that there is no queued command. If this flag is set the ADMA will inspect the SERV Bit in the ATA Status Register and the REL Bit in the ATA Sector Count Register on the assertion of ATAINTRQ.

13.1.1.4 ATA Tag (Byte 1, Bits 3–7)

If Bit 1(13.1.1.3) is to one this field contains the ATA TAG number associated with the overlapped command.

13.1.2 Channel Performance Parameters (Bytes 2,3)

The performance parameters for the device channel. These values will stick in the ADMA, on a operating mode change.

13.1.2.1 ATA Device Register PIO Mode (Byte 2, Bits 0–2)

The PIO Mode, as defined in ATA-5, to use when performing Command Block register transfers. For two Devices on a channel, this should be set to the lower of the two mode values reported by the Devices.

13.1.2.2 ATA Device-n Data Transfer Method (Byte 3, Bits 0–1)

00h=PIO

02h=Ultra DMA

All other values=Reserved.

13.1.2.3 ATA Device-n Data Transfer Mode (Byte 3, Bits 2–3)

If in PIO mode the operating mode defined in ATA-5. If in Ultra DMA mode the mode number as defined in the timing table XX.

13.1.3 ADMA Command Byte

This Byte is written by the Host to control the execution of the command set. When the CPB is loaded the contents are mapped into the same I/O space as the ADMA Command Register. The ADMA Command Register may be read but not written in Auto DMA Mode. The meanings on some of the bits change when in this mode. The contents of this Byte are not changed by the ADMA when the ADMA status is updated. Thus the host software has a record of the initial command conditions of the CPB.

The contents of this Byte and the ADMA Status Byte are examined during the ADMA scan phase. To ensure the CPB Ready Bit in the Command Byte must be set to one and the CPB Complete Bit in the ADMA Status Byte must be set to zero before the CPB is valid and ready for execution.

TABLE 13

ADMA Command Byte and Register

| Bit | Description |
| --- | --- |
| 7:3 | Reserved; shall be cleared to zero. |
| 4 | pINTA inhibit bit is set to one if the ADMA is NOT to interrupt the host when the CPB has completed. |
| 3 | R/W Control. This bit defines the direction of the bus master data transfer When 0 PCI reads (ATA writes-data transferred to the ATA Device) are performed When 1, PCI writes (ATA reads-data transferred from the ATA Device) are performed. |
| 2 | Reserved-will return 0 on reads |
| 1 | ATAP bit is set to one to indicate that the command set is for an ATAPI command and the ATA Byte Count Registers are significant. |
| 0 | CPB Ready Bit. This bit shall be set cleared to zero before updating ANY of the control fields of a CPB. When the CPB is ready to be executed this bit shall be set to one. |

13.1.4 CPB ID

The Host inserts an identification number from 0h to FFh in this field. The value is loaded into the ID register by the ADMA. The host may read this register to determine which CPB is being executed. The ADMA takes no action on this value, it is the host's responsibility to ensure that the value is unique within the chain. Note that for practical reasons the CPB should be unique, since the CPB ID has no operational function in the ADMA the values can be duplicated and thus the chain can be of infinite length.

13.1.5 ADMA Status Byte

This Byte shall be cleared to 00h by the Host when initializing the CPB. On return the ADMA will load the Byte the contents of the ADMA Status Register at the termination of the appropriate ADMA phase. The ADMA Status Register is read only when the ADMA is in Auto DMA mode. The bit settings in this Byte (Register) shall different meanings to those in SFF mode.

TABLE 14

ADMA Status Byte and Register

| Bit | Description |
| --- | --- |
| 7 | This bit is cleared to zero by the Host when loading the CPB entries. This bit is set to one by the UDMA when the CPB has been completed. This bit is not set when a overlapped command has released the bus. |
| 6 | This bit is set to one by the UDMA when a Overlapped command has released the bus. This bit is cleared by the UDMA when the Service command has been issued. |
| 5 | Set to one to indicate that the ADMA detected a CPB entry error. |
| 4 | PCI Error-The UDMA detected an error in the PCI transfer on the PCI bus. The error code will be in the PCI Status Register. |
| 3 | Forced Error-This bit is set when the ADMA forced a CRC Error in Ultra DMA mode. |
| 2 | The ATA Device Asserted ATA-INTRQ |
| 1 | ATA Error-Indicates that the ATA-ERR (CHK) Bit is set in the ATA status register. This bit should be set if Bit 3 is set |
| 0 | Active-This bit is set to one by the UDMA when the Data transfer is in progress. This bit is cleared to zero when the last PRD is exhausted. |

13.2 ADMA Chain Byte
13.2.1 Chain Register

TABLE 15

ADMA Chain Byte and Register

| 0 | 1 | 2 | 3 | 4 | 5 | 6 | 7 |
|---|---|---|---|---|---|---|---|
| ACTV | PSCHN | PSCPB | NTFY | CINTRQ | UINTRQ | CPBFN | 0 |
| R/W | R/W | R/W | R/W | R | R | R | R |

13.2.1.1 ACTV-CPB Active (Bit 0)

The Host sets this bit to one whenever it adds a CPB to the CPB chain or changes the status of a CPB to "Service Required". The ADMA clears this bit to zero whenever it accesses the CPB chain in search mode.

13.2.1.2 PSCHN—Pause Chain (Bit 1)

The Host sets this bit to one to pause any further processing of the CPB chain. The Host shall clear this bit to zero to allow the ADMA to scan and process the CPB chain.

13.2.1.3 PSCPB—Pause the Current Active PCB (Bit 2)

If the Host wishes to terminate a currently active PCB, it will set this bit to one. The ADMA will clear this bit if the CPB cannot be paused.

13.2.1.4 NTFY Notify When Inactive

If set to one the ADMA will interrupt the host when there are no more entries in the CPB chain that it can currently service.

13.2.1.5 CINTRQ Channel Interrupt

The INTRQ line on this channel caused a pINTA (PCI interrupt) to occur. It should be noted that this may not be the only reason a PCI interrupt has occurred.

13.2.1.6 UINTRQ Channel Interrupt

The UINTRQ line (unsolicited interrupt) on this channel caused a pINTA (PCI interrupt) to occur. It should be noted that this may not be the only reason a PCI interrupt has occurred.

13.2.1.7 CPBFN CPB Chain Finished

There are no more CPB entries that are either not started or released. If NTFY is set the ADMA will have interrupted.

13.3 ATA Command Data

Bits 0–2 are reserved and set to zero. Bits 3–7 are used to indicate the ATA command or control register to address. The bits directly map onto the register address to be mapped. Bits 8–15 contains the bit pattern to be written to the register.

TABLE 16

ATA Command Data

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 0 | 0 | 0 | CS0 | CS1 | AD0 | AD1 | AD2 | 0/1 | 0/1 | 0/1 | 0/1 | 0/1 | 0/1 | 0/1 | 0/1 |

The ADMA scans in the CPB reading the ATA Command data double words into its FIFO. When the ADMA detects the address decode for the ATA Command Register it will stop scanning. The maximum number of ATA Command Data double words is 12 (max CPB size is 16 in total). If this size is exceeded before an ATA Command Register Address is encountered the ADAM will halt with an error condition.

14 CPB Execution
14.1 Command Parameter Block Chain

Whenever the Host adds an entry to the chain, it will set ACTV to one. The ADMA will search along the chain, looking for CPBs that need service. If no CPBs need service, the ADMA will cease to search the chain, thereby reducing PCI and memory bus utilization.

14.2 CPB Execution Phases
14.2.1 Parameter Scan Phase

This phase is entered from the ATA Bus Release Phase, the Command Completion Phase or the host writing a Start Bit into the ADMA command Register. The ADMA searches the CPB chain for the next startable CPB. If none is found, the ADMA goes to its idle state.

14.2.2 Parameter Delivery Phase

Once the ADMA has determined that it has a valid executable CPB, it will enter the Parameter Delivery Phase. This phase is completed when all the register contents have been dispatched to the ATA channel, except the contents of the ATA Command Register. If the ADMA encounters an invalid register address or a register read indicator before the ATA Command Register, it will indicate an error and enter the Command Completion Phase.

14.2.3 Command Initialization Phase

The request to write the ATA Command Register indicates that all the parameters have been loaded and the Command Initialization Phase has been entered. This phase exists until the ATA Device indicates that the command has been accepted (either ATA-BSY is set and then cleared or the Device interrupts and ATA-BSY is cleared). If the Device indicates an error, the ADMA then enters the Command Completion Phase. If a queued command has been accepted, it will either be serviced immediately and be treated like a regular command or it will indicate a bus release.

14.2.4 ATA Bus Released Phase

If the command is a queued command and the bus has been released by the ATA Device, the ADMA enters the Bus Released Phase.

14.2.5 Tag Search Phase

This phase is entered when a Device interrupts with no command in execution. The ADMA reads the ATA Status Register and checks the SERV Bit. This will be set to one to indicate service is required. The ADMA will then issue a Service command to the ATA Device. The ATA Device will interrupt and the ADMA will read the ATA sector count register to obtain the TAG number. The ADMA then reads through the CPB chain looking for a released CPB that has a matching sub-channel, Device and Tag ID. It then reads in the ADMA configuration data and completes the transfer. If no CPB is found, the ATA Device indicates an error, or the SERV Bit was not set, the ADMA enters the Command Completion Phase, indicating an error.

14.2.6 Data Transfer Phase

If the ATA command involves data transfer and it is not a released queued command, the Data Transfer Phase is entered. This phase is continued until the transfer reaches normal completion or is prematurely terminated by the ATA Device or by a request from the Host. At the end of the transfer the ADMA reads the ATA Status Register and examines the Error Bit.

14.2.7 Command Completion Phase

This phase can be entered from any phase. The ADMA will update the ADMA status register Byte in the current CPB. PCI INTAn is asserted. If there are no errors, the Parameter Scan Phase is entered; otherwise, the ADMA halts.

14.3 Host Pausing of a CPB Chain

The Host may attempt to pause an active chain, at any time, by setting PSCHN to one. The ADMA will complete any currently active CPB but will not initiate a search of the CPB chain. Upon completion of the current CPB or if no CPB is being serviced, the ADMA will assert INT-HST. The Host may then modify the CPB-SW of any of the CPB entries in the chain.

14.4 Host Termination of an Active CPB

Once the Host has written a CPB, it will normally not update the CPB, until the ADMA has indicated that the command is completed. The CPB may then be reused for another command set. In some circumstances, the Host may wish to terminate a command set before total completion.

To do this, the Host will attempt to pause the ADMA by setting the Pause-CPB Bit in the Chain Register. The Host then reads the Chain Register. If the current CPB can be paused, the Pause-PCB Bit will be set. If the ADMA cannot pause the current CPB, the Pause-CPB Bit will be cleared. If the Pause-CPB Bit is set, the Host shall then read the Current CPB Register. If the current CPB is the CPB which it wishes to terminate, the Host shall then write the Terminate Bit in the Chain Register. If the current CPB is not the target CPB, the Host may update the CPB-SW, to indicate that it does not need service. After either action, the Host shall clear the Pause-CPB Bit.

The Host will then wait for normal completion of the CPB and examine the CPB-SW to determine how far the CPB had been processed prior to termination.

14.4.1 ADMA's Response to a CPB Termination Request.

To terminate a currently active CPB, the Host must follow the protocol described in Section 14.4. If the Host attempts to set the Terminate Bit in the Chain Register without the Pause Bit being set, the Termination Bit shall be ignored by the ADMA.

14.4.1.1 Already Paused

If the Termination Bit has to be set while the ADMA is paused, the action taken will depend on the CPB's execution phase. While in the Parameter Delivery Phase, the ADMA will immediately transition to the Command Completion Phase, indicating the reason in the CPB-SW.

14.4.1.2 Dat Transfer Phase

If in the Data Transfer Phase, the ADMA will attempt to terminate the transfer. In ADMA Mode, it will do this by terminating the ADMA-Burst and deliberately corrupting the CRC. This may result in the ATA Device prematurely terminating the command. This action will result in an error indication in the ATA Status Register. Upon transition to the Command Completion Phase, the reason for the termination will be indicated and the actual transfer length will be indicated.

14.4.1.3 Initialization Phase

During the Command Initialization Phase, the CPB cannot be terminated. If the subsequent phase is the Data Transfer Phase, the ADMA will respond as described in 14.4.1.2.

15 Channel Command Interpreter

The channel command interpreter monitors all ATA command traffic. It will respond to requests for ADMA identification and revision information, auto polling implementation, unsolicited interrupt and HotPort™ change notification.

The unit also keeps track of the current sub-channel number to enable CPB ID matching.

What is claimed is:

1. In an ATA compatible data transfer system, an automated direct memory access (ADMA) system comprising:
   a PCI interface portion for communicating with a host computer;
   a BIOS interface portion adapted for communication with a flash memory device;
   at least a first ATA interface for communicating with an ATA device; and
   a set of ADMA internal registers, wherein the internal registers include command parameter block (CPB) information, disposed in a CPB chain defining a linked list of CPB entries, each CPB entry containing at least the ATA commands for an ATA device, and wherein the ADMA system controls an ATA channel in accordance with sequential linked commands without requiring interrupt servicing by the host computer between channel command executions.

2. In an ATA compatible data transfer system, an automated direct memory access (ADMA) method comprising:
   providing a set of command parameter blocks (CPB), the blocks disposed in a CPB chain defining a linked list of CPB entries, each CPB entry containing at lest the ATA commands for an ATA device;
   providing a set of physical region descriptors (PRD), a set of PRDs associated with each CPB, each PRD defining a memory location to which data is read from or written to; and
   sequentially executing entries in a plurality of CPBs, without requiring interrupt servicing by the host computer between channel command executions.

* * * * *